United States Patent
Kim et al.

(10) Patent No.: US 12,227,424 B2
(45) Date of Patent: Feb. 18, 2025

(54) METHOD FOR DRYING WET-GEL BLANKET AND METHOD FOR PRODUCING AEROGEL BLANKET USING THE SAME

(71) Applicant: LG CHEM, LTD., Seoul (KR)

(72) Inventors: Mi Ri Kim, Daejeon (KR); Jin Oh Song, Daejeon (KR); Young Hun Kim, Daejeon (KR); Se Won Baek, Daejeon (KR); Jae Hoon Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 641 days.

(21) Appl. No.: 17/608,531

(22) PCT Filed: Aug. 7, 2020

(86) PCT No.: PCT/KR2020/010472
§ 371 (c)(1),
(2) Date: Nov. 3, 2021

(87) PCT Pub. No.: WO2021/029624
PCT Pub. Date: Feb. 18, 2021

(65) Prior Publication Data
US 2022/0219996 A1    Jul. 14, 2022

(30) Foreign Application Priority Data
Aug. 9, 2019 (KR) .......... 10-2019-0097517

(51) Int. Cl.
*C01B 33/158* (2006.01)
*C01B 33/145* (2006.01)
(Continued)

(52) U.S. Cl.
CPC ........ *C01B 33/1585* (2013.01); *C01B 33/145* (2013.01); *C01B 33/155* (2013.01); *C01B 33/159* (2013.01); *C01P 2006/32* (2013.01)

(58) Field of Classification Search
CPC . C01B 33/1585; C01B 33/145; C01B 33/155; C01B 33/159; C01B 33/154;
(Continued)

(56) References Cited

U.S. PATENT DOCUMENTS

2006/0125158 A1    6/2006  Rouanet et al.
2018/0127277 A1*   5/2018  Kim .................. B01J 19/12
(Continued)

FOREIGN PATENT DOCUMENTS

CN    101348255       1/2009
CN    101691227 A     4/2010
(Continued)

OTHER PUBLICATIONS

Machine Translation, KR-20180033064-A (Year: 2018).*
Machine Translation, CN-107266116-A (Year: 2017).*

*Primary Examiner* — Michael G Miller
(74) *Attorney, Agent, or Firm* — Bryan Cave Leighton Paisner LLP (57) ABSTRACT

Provided is a method for drying a wet-gel blanket which can have an excellent heat insulation performance by minimizing shrinkage of a gel network structure that occurs during drying, and has excellent drying efficiency versus time, and a method for producing an aerogel blanket using same.

10 Claims, 2 Drawing Sheets

(51) Int. Cl.
*C01B 33/155* (2006.01)
*C01B 33/159* (2006.01)

(58) Field of Classification Search
CPC .............. C01P 2006/32; C01P 2006/12; C01P 2006/14; C01P 2006/16; C04B 30/00; C04B 30/02
See application file for complete search history.

(56) References Cited

U.S. PATENT DOCUMENTS

| | | |
|---|---|---|
| 2018/0325244 A1 | 11/2018 | Jeong et al. |
| 2019/0062167 A1 | 2/2019 | Kim et al. |
| 2021/0198112 A1 | 7/2021 | Oh et al. |

FOREIGN PATENT DOCUMENTS

| | | | | |
|---|---|---|---|---|
| CN | 101456569 B | | 9/2012 | |
| CN | 106669588 | | 5/2017 | |
| CN | 107266116 A | * | 10/2017 | ........... C04B 20/023 |
| CN | 108473321 A | | 8/2018 | |
| EP | 3305726 A1 | | 4/2018 | |
| EP | 3375757 A1 | | 9/2018 | |
| JP | 2011-190548 A | | 9/2011 | |
| JP | 2019-513665 A | | 5/2019 | |
| JP | 2021-523088 A | | 9/2021 | |
| KR | 10-1998-0073855 | | 11/1998 | |
| KR | 20-2008-0001404 U | | 5/2008 | |
| KR | 10-2010-0053350 | | 5/2010 | |
| KR | 10-2012-0122797 | | 11/2012 | |
| KR | 10-2016-0141669 | | 12/2016 | |
| KR | 10-2017-0053515 | | 5/2017 | |
| KR | 10-2018-0033064 | | 4/2018 | |
| KR | 20180033064 A | * | 4/2018 | .............. B01J 27/24 |

\* cited by examiner

METHOD FOR DRYING WET-GEL BLANKET AND METHOD FOR PRODUCING AEROGEL BLANKET USING THE SAME

CROSS-REFERENCE TO RELATED APPLICATIONS

This application is a National Stage Application of International Application No. PCT/KR2020/010472 filed on Aug. 7, 2020, which claims priority to and the benefit of Korean Patent Application No. 10-2019-0097517, filed on Aug. 9, 2019, in the Korean Intellectual Property Office, the disclosure of which is incorporated herein in its entirety by reference.

TECHNICAL FIELD

The present invention relates to a method for drying a wet-gel blanket which can have an excellent heat insulation performance by minimizing shrinkage that occurs during drying, and has excellent drying efficiency versus time, and a method for producing an aerogel blanket using the drying method.

BACKGROUND

Aerogel is a highly porous material composed of nanoparticles, and has high porosity, specific surface area, and low thermal conductivity, and thus has attracted considerable attention as uses such as a high efficiency insulation material and a soundproof material. Since such aerogel has a very low mechanical strength due to its porous structure, an aerogel composite in which aerogel is impregnated into a fibrous blanket having an inorganic fiber, an organic fiber, or the like, which is an existing insulating fiber, and bonded to the fibrous blanket is being developed.

For example, a silica aerogel-containing blanket using silica aerogel is prepared by preparing a silica sol, gelating, aging, surface-modifying, and drying.

In the field of the aerogel blanket, generally, a normal pressure hot air drying method (hot air drying) has been primarily carried out. However, the hot air drying method has a limitation in that a solvent having higher volatility is evaporated earlier than water having lower volatility because a drying sample is gradually heated from the outside to the inside, and thus as drying is progressed, a water content in pores of gels increases so that a capillary phenomenon occurs frequently to destroy a pore structure due to shrinkage, etc. The aerogel blanket, in which the pore structure is destroyed, has a limitation of relatively deteriorating heat insulation performance. These limitations can be deteriorated in the case in which drying is performed immediately without substitution with an organic solvent having a low surface tension.

In addition, there is a limitation in that the hot air drying method takes a long time to increase the temperature of the drying sample to the optimal drying temperature, and thus drying is performed at a temperature lower than the optimal drying temperature, thereby reducing drying efficiency.

A supercritical drying method is proposed as a method for compensating low drying efficiency and heat insulation performance deterioration of the hot air drying method. The supercritical drying method is a method in which a supercritical fluid, for example, supercritical $CO_2$ is added to a high pressure reactor, $CO_2$ is substituted with ethanol in a wet-gel blanket, and the substituted ethanol is extracted, thereby drying the wet-gel blanket. However, there is a disadvantage in that the supercritical drying method requires a separate drying device for supercritical extraction, and thus the initial investment cost is very high. In addition, since the supercritical drying method has to go through a compression-extraction-decompression step, there is a limitation in that the time required for drying is long, and since the drying is performed in a supercritical extractor, there is a disadvantage in that a continuous drying process is impossible and only a batch process is possible.

Thus, there is a need for studies on: a method for drying a wet-gel blanket which can achieve economical effects because the initial investment cost and maintenance cost of the drying device are not largely consumed, and which has excellent drying efficiency, and minimizes shrinkage during drying to ensure excellent heat insulation performance; and a method for producing an aerogel blanket using the same.

BRIEF DESCRIPTION

Technical Problem

An aspect of the present invention provides a method for drying a wet-gel blanket which can have an excellent heat insulation performance by minimizing shrinkage of a gel network structure that occurs during drying, and has excellent drying efficiency versus time.

Another aspect of the present invention also provides a method for producing an aerogel blanket using the drying method.

Technical Solution

According to an aspect of the present invention, there is provided a method for drying a wet-gel blanket, the method including drying the wet-gel blanket by irradiating the wet-gel blanket with infrared rays (IR), wherein in the drying, infrared rays are irradiated so that a first isothermal section of 5 minutes to 30 minutes, a temperature rising section of 5 minutes to 30 minutes, and a second isothermal section of 20 minutes or less are included in a temperature profile over time of drying the wet-gel blanket.

According to another aspect of the present invention, there is provided a method for producing an aerogel blanket, the method including: 1) mixing a precursor material, an organic solvent, water, and an acid catalyst to prepare a sol; 2) depositing and gelating the sol on a blanket base to form a wet-gel blanket by the gelating reaction; 3) surface-modifying the wet-gel blanket to form a surface-modified wet-gel blanket; and 4) drying the surface-modified wet-gel blanket, wherein the drying is performed by the above-described drying method.

Advantageous Effects

The present invention can quickly and uniformly increase a temperature to the inside of a gel by infrared rays so that a solvent and moisture in the gel are dried simultaneously, thereby minimizing shrinkage of the aerogel that occurs during drying. As a result, the present invention has excellent pore characteristics and physical properties such as high specific surface area, and can secure excellent heat insulation performance. In addition, the present invention has an advantage in that drying can be performed on a single-side or on a double-side (both sides) because the irradiation direction of infrared rays is free, and thus, even if the wet-gel blanket is thick, drying efficiency does not decrease and excellent drying efficiency can be maintained, and the drying can be performed within a relatively short time. In addition, excellent drying efficiency can prevent the problem of bad smell occurring in the remaining solvent.

In addition, since the present invention can control a drying time for each drying section to exhibit excellent drying efficiency and suppress a decrease in water repellency, hydrophobicity can be maintained at an excellent level even after drying.

BRIEF DESCRIPTION OF THE DRAWINGS

The following drawings attached herein illustrates a specific embodiment of the present invention by example, and serves to enable technical concepts of the present invention to be further understood together with detailed description of the invention given below, and therefore the present invention should not be interpreted only with matters in such a drawing.

DETAILED DESCRIPTION

Hereinafter, the present invention will be described in detail with reference to the drawings. Terms or words used in this specification and claims should not be interpreted as being limited to a conventional or dictionary meaning, and should be interpreted as the meaning and concept that accord with the technical spirit, based on the principle that an inventor can appropriately define the concept of a term in order to explain the invention in the best ways.

Method for Drying Wet-Gel Blanket

The present invention provides a method for drying a wet-gel blanket, the method including drying the wet-gel blanket by irradiating the wet-gel blanket with infrared rays (IR), wherein in the drying, infrared rays are irradiated so that a first isothermal section of 5 minutes to 30 minutes, a temperature rising section of 5 minutes to 30 minutes, and a second isothermal section of 20 minutes or less are included in a temperature profile over time of drying the wet-gel blanket.

In this case, the temperature of a sample is measured after inserting and fixing a thermocouple into the center of the sample.

Figure 1:
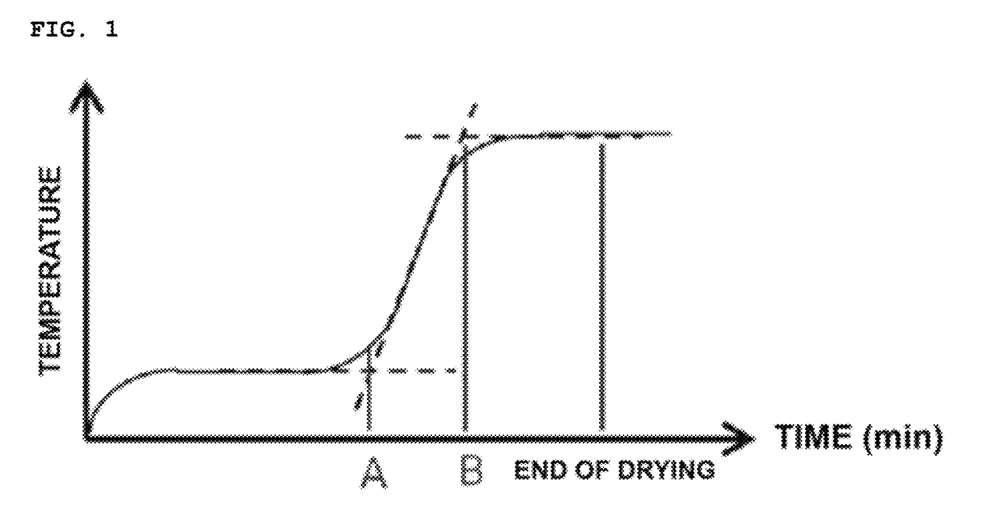
FIG. 1 is a graph illustrating a temperature profile of a drying sample over drying time in order to show temperature changes during drying according to an embodiment of the present invention.

In addition, the term 'temperature profile over time' herein refers to a graph illustrating temperature changes of the wet-gel blanket drying sample over time, and for example, it can mean a graph in which the x-axis represents a time and the y-axis represents a temperature as shown in FIG. 1 of the present invention.

Here, a first isothermal section refers to a drying section from the drying start point to the isothermal drying end point that first appears, and refers to a section from the drying start point in the temperature profile over time of the drying sample to a contact point (hereinafter, referred to as a first contact point) of a tangent line in an isothermal line that first appears after the start of drying and a tangent line in a heating line elevated with a constant inclination value. The first isothermal section can represent a section in which the temperature of the drying sample is not elevated even if the ambient temperature is elevated due to the latent heat of vaporization of a solvent and is dried at a constant temperature. In addition, in the temperature profile of the present invention as in FIG. 1, when heated after the isothermal drying, a heating degree is equally shown after a certain time, and thus a region having an equal inclination value appears, and in this case, the heating line elevated with a constant inclination value means a heating line in a region having an equal inclination value not having 0 as the inclination value.

Also, the temperature rising section refers to a drying section from the end of a first isothermal drying to the end of a heating drying, and refers to a section from the first contact point as described above in the temperature profile over time of the drying sample to a contact point (hereinafter, referred to as a second contact point) of a tangent line in the heating line elevated with a constant inclination value and a tangent line in an isothermal line that second appears after the start of drying. The heating drying section can refer to a section in which most solvent is dried, and thus the temperature of the drying sample increases sharply.

In addition, the second isothermal section refers to a drying section from the end of the heating drying to the end of the final drying, and refers to a section from the second contact point as described above in the temperature profile over time of the drying sample to a time point when the drying is completely finished. The second isothermal section can refer to a section in which an additional drying is performed in order to remove catalyst residues used in the preparation of the wet-gel blanket, and in this case, since the sample temperature is equilibrated with the ambient temperature, the temperature does not increase sharply, and a constant temperature can be maintained.

According to an embodiment of the present invention, the drying in the first isothermal section can be performed for 5 minutes to 30 minutes, particularly, 10 minutes to 25 minutes, and more particularly 10 minutes to 20 minutes, the drying in the temperature rising section can be performed for 5 minutes to 30 minutes, particularly, 5 minutes to 25 minutes, and more particularly 10 minutes to 20 minutes, and the drying in the second isothermal section can be performed for 20 minutes or less, particularly, 0 minutes to 20 minutes, 0 minutes to 15 minutes, and more particularly 0 minutes to 5 minutes.

According to an embodiment of the present invention, in order that the second isothermal section does not appear as the time range above, performing the drying is also included in the scope of the present invention, and although the second isothermal section is not performed, the effect desired by the present invention can be exhibited equally. That is, the drying can optionally include the second isothermal section. Therefore, according to an embodiment of the present invention, the drying can include the first isothermal section and the temperature rising section, or can include the first isothermal section, the temperature rising section, and the second isothermal section.

Here, the solvent to be dried according to the drying method can be a solvent used in the preparation of the wet-gel blanket, and particularly can include water and an organic solvent. In addition, the organic solvent can be particularly alcohol, where the alcohol can be monohydric alcohol such as methanol, ethanol, isopropanol and butanol; polyhydric alcohol such as glycerol, ethylene glycol, propylene glycol, diethylene glycol, dipropylene glycol, and sorbitol, and one of the above materials or a mixture of two or more thereof can be used. Among these, when considering miscibility with water and aerogel, monohydric alcohol having 1 to 6 carbon atoms such as methanol, ethanol, isopropanol, butanol, and the like, and particularly ethanol can be used.

In addition, the solvent can contain 85 to 95 wt % of the organic solvent and 5 to 15 wt % of water.

When the drying is performed to exceed the time range above of the first isothermal section or the temperature rising section, since the organic solvent having higher volatility than water in the solvent is first evaporated, as drying is progressed, a water ratio in pores of the gels increases relatively so that a capillary phenomenon can occur, and thus shrinkage, in which a pore structure collapses, can occur. There can occur a problem in that the aerogel blanket having collapsed pore structure due to the shrinkage has high thermal conductivity and has deteriorated heat insulation performance. In addition, when the drying is performed below the time range above of the first isothermal section or the temperature rising section, the energy amount that the wet-gel blanket receives during drying is too much to maintain the pore structure, and thus some pore structures can collapse, and furthermore, there can occur a problem in that a lot of hydrophobicizing groups present in the wet-gel blanket are lost and thus hydrophobicity is deteriorated. When the first isothermal section and the temperature rising section satisfy the time range above, there are advantages in that water and the organic solvent can be dried at the same time to thus maintain the pore structure stably, the loss of the hydrophobicizing groups can be minimized to thus maintain the hydrophobicity at an excellent level, and the drying of the solvent can be easily performed even for a relatively short drying time compared to other methods, and thus the drying efficiency is high.

In addition, when the drying is performed to exceed the time range above of the second isothermal section, even though most solvent is dried, drying is continued, and thus there can occur a problem in that the hydrophobicizing groups of the aerogel blanket, in particular, the hydrophobicizing groups present on the surface thereof are lost a lot so that the hydrophobicity is largely deteriorated.

Furthermore, according to an embodiment of the present invention, the total drying time can be adjusted to have the first isothermal drying section, the heating drying section, and the second isothermal drying section, particularly, the drying can be performed to have a total drying time of 10 minutes to 80 minutes, 15 minutes to minutes, or 15 minutes to 50 minutes, and more particularly, the drying can be performed to have a total drying time of 20 minutes to 45 minutes.

In addition, according to an embodiment of the present invention, a surface temperature of an infrared ray emitting body which is a heat source in an infrared ray drying is not limited as long as it can exhibit an aspect of the drying as described above, and can be, for example, 200° C. to 1,100° C., and particularly 250° C. to 900° C. When the emitting body having the surface temperature in the above range is used, the drying of the solvent is easily performed, and simultaneously, the loss of the hydrophobicizing groups can be minimized to maintain excellent hydrophobicity. In order to well exhibit the drying aspect (temperature profile) specified in the present invention and secure stability during the drying process, the surface temperature of the infrared ray emitting body can be more particularly 250° C. to 700° C. or 400° C. to 700° C.

In addition, according to an embodiment of the present invention, it is preferable to use a carbon heater for mid-infrared rays (MIR) and a ceramic heater for far-infrared rays (FIR) as the type of the infrared ray emitting material in order to prevent the hydrophobicizing groups from being removed. In addition, a wavelength of the infrared rays to be irradiated is not limited as long as it can exhibit the above-described drying aspect and can be included in the mid-infrared range or the far-infrared range, which is generally known, but, for example, infrared rays in a wavelength range of 2 μm to 15 μm can be included, or infrared rays having an average wavelength of 2 μm to 15 μm of a main peak when irradiating the wet-gel blanket with infrared rays can be included.

In addition, when performing the drying according to the present invention, the distance between the emitting body and the wet-gel blanket as a drying sample is not limited as long as it can exhibit the above-described drying aspect, and can be, for example, 50 mm to 170 mm. When the distance is controlled to have the distance in the above range, water and the organic solvent can be dried at the same time, and thus the drying of the solvent is easily performed as well as the loss of the hydrophobicizing groups can be minimized to thus maintain excellent hydrophobicity. In order to well exhibit the drying aspect specified in the present invention, secure excellent hydrophobicity by preventing the hydrophobicizing group from being removed during drying, and increase the removal rate of the solvent, the distance can be particularly 70 mm to 170 mm, and more particularly, 90 mm to 150 mm.

In addition, according to an embodiment of the present invention, the wet-gel blanket can be a fiber-silica gel composite, and particularly, can be a fiber-silica gel composite which is prepared by depositing and gelating a silica sol to a blanket base, which is a fiber.

In the present invention, the solvent and water in the gel can be dried simultaneously by controlling the above-described drying aspect, that is, the first isothermal section, the temperature rising section, and the second isothermal section to have the above-described time, and thus the removal efficiency of the solvent and residues are excellent, as well as shrinkage of the gel network structure can be minimized to thus secure excellent heat insulation performance. In addition, the above-described drying aspect can prevent the removal of the hydrophobicizing groups due to the continuation of unnecessary drying, and as the removal of the hydrophobicizing groups is reduced, the dried aerogel blanket can exhibit excellent hydrophobicity.

Method for Producing Aerogel Blanket

The present invention provides a method for producing an aerogel blanket, the method including: 1) mixing a precursor material, an organic solvent, water, and an acid catalyst to prepare a sol; 2) depositing and gelating the sol on a blanket base to form a wet-gel blanket; 3) surface-modifying the wet-gel blanket to form a surface-modified wet-gel blanket; and 4) drying the surface-modified wet-gel blanket, wherein the drying is performed by the above-described drying method.

Step 1

Step 1) above is preparing a sol, and the sol can be prepared by mixing a precursor material, an organic solvent, water, and an acid catalyst.

According to an embodiment of the present invention, the sol of the present invention can be, for example, a silica sol, and when the sol is a silica sol, the precursor material can be a silica precursor.

The silica precursor can be a silicon-containing alkoxide-based compound, particularly, tetraalkyl silicate such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, tetradodecyl orthosilicate, and the like. More particularly, the silica precursor can be tetraethyl orthosilicate (TEOS).

The silica precursor can be used in an amount so that a content of the silica contained in the silica sol is 0.1 wt % to 30 wt %, but is not limited thereto. When the content of the silica satisfies the above range, mechanical properties of the aerogel blanket, in particular, flexibility can be secured at an excellent level as well as improved heat insulation effect can be exhibited.

The organic solvent can include particularly alcohol, and more particularly, monohydric alcohol such as methanol, ethanol, isopropanol and butanol; polyhydric alcohol such as glycerol, ethylene glycol, propylene glycol, diethylene glycol, dipropylene glycol, and sorbitol, and one of the above materials or a mixture of two or more thereof can be used. Among these, when considering miscibility with water and aerogel, monohydric alcohol having 1 to 6 carbon atoms such as methanol, ethanol, isopropanol, butanol, and the like, and for example, ethanol can be used.

Such an organic solvent can be used in an appropriate content by a person skilled in the art in consideration of promoting the surface-modifying reaction and the hydophobicity in the finally produced aerogel blanket.

The acid catalyst can promote the gelation of the sol, which will be described below, can include, particularly, at least one inorganic acid such as nitric acid, hydrochloric acid, acetic acid, sulfuric acid, and hydrofluoric acid, and can be used in a content so that the gelation of the sol is promoted.

Step 2

Step 2) above is for depositing and gelating the sol on a blanket base to prepare a wet-gel blanket, and can be performed by adding a base catalyst to the sol and then depositing the mixture on the blanket base.

In the present invention, the gelation can form a network structure from the precursor material, and the network structure can show a planar net shape structure in which particular polygons having one or more types of atom arrangements are connected, or a structure in which vertices, edges, faces, etc. of a particular polyhedron are shared to form a three-dimensional skeleton structure.

The base catalyst, which can be used in order to induce the gelation reaction, allows the sol to increase in pH, thereby promoting gelation.

The base catalyst can include inorganic bases such as sodium hydroxide and potassium hydroxide; or an organic base such as ammonium hydroxide, but in the case of an inorganic base, there is a concern that metal ions contained in a compound can be coordinated with a Si—OH compound, and thus an organic base can be preferred.

Specifically, the organic base can include ammonium hydroxide ($NH_4OH$), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethylamino) ethanol, 2-(methylamino)ethanol, N-methyl diethanolamine, dimethylaminoethanol, diethylaminoethanol, nitrilotriethanol, 2-(2-aminoethoxy)ethanol, 1-amino-2-propanol, triethanolamine, monopropanolamine, dibutanolamine, or the like, and a mixture of two or more thereof can be used. More specifically, the base can be ammonium hydroxide ($NH_4OH$).

The base catalyst can be included in an amount so that the pH of the sol, particularly, the silica sol is to 8. The gelation can be easily performed in the above-described pH range, thereby further improving processability. In addition, since the base catalyst can be precipitated when being put into a solid phase, it can be preferably added in a solution phase that is diluted with the organic solvent of step 1) above, such as alcohol.

The gelation of the sol can occur in a state in which the sol, particularly, the sol catalyzed by adding the base catalyst is deposited on the blanket base.

The deposition can be performed in a reaction vessel capable of receiving the blanket base, and the deposition can be carried out by pouring the silica sol into the reaction vessel or by putting and wetting the blanket base in the reaction vessel containing the sol. In this case, in order to improve the bonding between the blanket base and the sol, the blanket base can be slightly pressed so as to be sufficiently impregnated. Thereafter, the blanket base can be pressed to a certain thickness with a constant pressure to remove excessive sol, thereby reducing subsequent drying time.

The blanket base can be a film, a sheet, a net, fiber, foam, nonwoven fabric, or a laminate having two or more layers thereof. Also, surface roughness can be formed or patterned on the surface of the blanket according to application of the blanket. Specifically, the base for the blanket can be a fiber that can further improve heat insulation performance by including a space or an aperture which makes it easy to insert the sol into the blanket base and form aerogel, and the base having low thermal conductivity can be used.

Specifically, the blanket base can be polyamide, polybenzimidazole, polyaramid, an acrylic resin, a phenol resin, polyester, polyether ether ketone (PEEK), polyolefin (for example, polyethylene, polypropylene, or a copolymer thereof), cellulose, carbon, cotton, wool, hemp, non-woven fabric, glass fiber, ceramic wool, or the like.

According to an embodiment of the present invention, an aging step can be further included after step 2) above.

The aging is an optional step, in which the wet-gel blanket is left at an appropriate temperature to complete a chemical change, and thus a network structure can be formed more stably and mechanical stability can also be enhanced.

The aging of the present invention can be performed by leaving the wet-gel blanket in the above-described organic solvent or without the organic solvent at a temperature of 40° C. to 90° C. for 1 hour to 10 hours. The organic solvent can be the organic solvent as described in step 1) above. In another embodiment, a solvent in the aging can be a solution in which a base catalyst such as sodium hydroxide (NaOH), potassium hydroxide (KOH), ammonium hydroxide ($NH_4OH$), triethylamine, or pyridine is diluted in the above-described organic solvent in a concentration of 1% to 10%.

Step 3

Step 3) above is a surface-modifying step for a wet-gel formed by the gelation reaction, and can hydrophobicize a wet-gel blanket, particularly, a silica wet-gel blanket with a surface modification agent. Specifically, the step can be performed by bonding hydrophobicizing groups derived from the surface modification agent on the surface of the silica wet-gel.

In a silica aerogel blanket, there is a disadvantage that a silanol group (Si—OH) is present on the silica surface, and thus water in air is absorbed due to the hydrophilicity thereof, thereby increasing thermal conductivity gradually. Therefore, there is a need for preliminarily modifying the surface of the silica aerogel to increase hydrophobicity in order to maintain low thermal conductivity by suppressing absorbing water in air.

The surface modification agent of the present invention is not limited as long as it is a compound that hydrophobicates the surface of the wet-gel, and can be, for example, a silane-based compound, a siloxane-based compound, a silanol-based compound, a silazane-based compound, or a combination thereof.

Specifically, the surface modification agent can be a silane-based compound including trimethylchlorosilane (TMCS), dimethyl dimethoxy silane, dimethyl diethoxy silane, methyl trimethoxy silane, trimethyl ethoxy silane, vinyl trimethoxy silane, ethyl triethoxy silane, phenyl triethoxy silane, phenyl trimethoxy silane, tetraethoxy silane, dimethyl dichloro silane, 3-aminopropyl triethoxy silane, or the like; a siloxane-based compound including polydimethyl siloxane, polydiethyl siloxane, octamethyl cyclotetra siloxane, or the like; a silanol-based compound including trimethylsilanol, triethylsilanol, triphenylsilanol, t-butyldimethylsilanol, and the like; a silazane-based compound 1,2-diethyldisilazane, 1,1,2,2-tetramethyldisilazane, 1,1,3,3-tetramethyl disilazane, 1,1,1,2,2,2-hexamethyldisilazane (HMDS), 1,1,2,2-tetraethyldisilazane, 1,2-diisopropyldisilazane, or the like; or a combination thereof, and specifically can be hexamethyldisilazane.

The surface modification agent can be used as a solution phase diluted in an organic solvent, and the organic solvent can be the above-described organic solvent in step 1), and in this case, the surface modification agent can be diluted in an amount of 1 vol % to 15 vol % with respect to a total volume of the diluted solution.

In addition, the surface modification agent can be added in an amount of 0.01 vol % to 10 vol % with respect to the silica wet-gel. If the adding amount of the surface modification agent with respect to the silica wet-gel is less than 0.01 vol %, there can occur a problem in that the amount of the surface modification agent, which can react with the silanol group (Si—OH) in the silica wet-gel, is less than the amount of the silanol group, thereby the surface modification reactivity may be reduced as well as the surface modification may not be easily performed, and thus the silanol group, which is not surface-modified during drying, is subjected to a condensation reaction so that the pore size of the finally produced silica aerogel becomes smaller and the porosity is not achieved. In addition, if the amount of the surface modification agent added with respect to the silica wet-gel is greater than 10 vol %, there can occur a problem in that the residual surface modification agent, which does not participate in the surface modification reaction, remains in excess, and the expensive surface modification agent is wasted to reduce economics.

Step 3) above can be performed by adding the surface modification agent at a temperature of 50° C. to 90° C., and particularly, 50° C. to 70° C. for 1 hour to 24 hours.

Step 4

Step 4) above is drying the silica wet-gel, and is performed by the infrared ray drying method of the present invention.

The description of the infrared ray drying method of the wet-gel blanket is the same as described above.

Meanwhile, in the method for producing a silica aerogel blanket according to an embodiment of the present invention, washing can further be performed before the drying. The washing is for obtaining a highly pure hydrophobic aerogel blanket by removing impurities and residual ammonia generated during reaction, and can be performed with a dilution process or an exchange process using a nonpolar organic solvent.

FIG. 1 schematically illustrates an embodiment of temperature changes over time during drying according to the present invention. In FIG. 1, A is a time point in which the first isothermal section specified by the present invention is ended, and B is a time point in which the temperature rising section specified by the present invention is ended. However, configurations below described in embodiments and drawings of the present specification indicate only the most specific example rather than indicating all the technical spirits of the present invention, and thus, it is to be understood that various equivalents and modifications, which can replace the configurations, can be present.

EXAMPLES

Hereinafter, the present invention will be described in detail according to examples for better understanding of the present invention. The invention can be, however, embodied in many different forms and should not be construed as being limited to the embodiments set forth herein. Rather, these exemplary embodiments are provided so that this description will be thorough and complete, and will fully convey the scope of the present invention to those skilled in the art.

Example 1

A hydrochloric acid solution (concentration=0.15 wt %) diluted with water was added to a mixed solution which was prepared by mixing tetraethyl orthosilicate (TEOS) and ethanol in a weight ratio of 3:1 so that the pH of the mixed solution becomes 1, and then mixed to prepare a silica sol (silica content in the silica sol=4 wt %). Then, an ammonia catalyst was added to the silica sol in an amount of 0.5 vol %, and a glass fiber was deposited and the sol then gelated to prepare a silica wet-gel composite.

The prepared silica wet-gel composite was left and aged in an ethanol solution at a temperature of 70° C. for 5 hours.

Thereafter, a surface modification agent solution, which was prepared by mixing hexamethyldisilazane and ethanol in a volume ratio of 1:9, was added in an amount of 90 vol % with respect to the wet-gel, and the wet-gel was surface-modified at 70° C. for 24 hours to prepare a hydrophobic silica wet-gel composite. Thereafter, the surface-modified wet-gel blanket was placed on a substrate of an infrared ray drying device equipped with an infrared lamp, and the infrared ray drying (double-side drying) was performed with conditions listed in Table 1 below to prepare an aerogel blanket.

Example 2 to Example 6

Each aerogel blanket was prepared by the same manner as in Example 1 except that the infrared ray drying conditions in Example 1 above were changed to the conditions listed in Table 1 below.

Comparative Example 1

An aerogel blanket was prepared by the same manner as in Example 1 except that the wet-gel blanket prepared in Example 1 above was not subjected to the infrared ray drying, but subjected to a hot air drying in an oven for 40 minutes under a temperature condition of 170° C.

Comparative Example 2

An aerogel blanket was prepared by the same manner as in Example 1 except that the wet-gel blanket prepared in Example 1 above was not subjected to the infrared ray drying, but subjected to a supercritical drying.

In this case, the supercritical drying was performed as follows. The wet-gel blanket was put in a supercritical extractor, and $CO_2$ was injected thereto. Thereafter, the temperature in the extractor was elevated for 1 hour to 60° C., and the supercritical drying was performed at 60° C. and 100 bar for 4 hours. Thereafter, $CO_2$ was vented for 2 hours to prepare an aerogel blanket.

Comparative Examples 3 to 7

Each aerogel blanket was prepared by the same manner as in Example 1 except that the infrared ray drying conditions in Example 1 above were changed to the conditions listed in Table 1 below.

Experimental Example

1) Measurement of Drying Time

With respect to Examples and Comparative Examples in which the infrared ray drying was performed, drying time for each temperature section was measured, and the results are shown in Table 1. Specifically, a temperature profile was derived from inserting a thermocouple into the center of the wet-gel blanket sample to be dried, and the drying time for each section and the total drying time were derived from the temperature profile.

Figure 2:
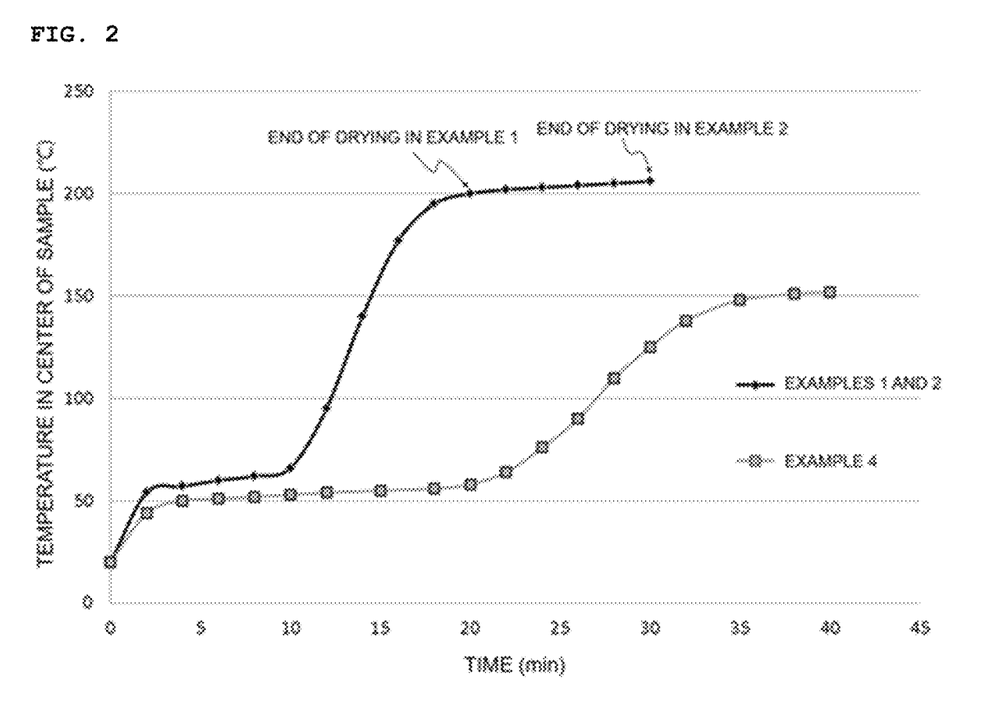
FIG. 2 is a graph illustrating a temperature profile of a drying sample over drying time derived from Examples 1, 2, and 4.
Figure 3:
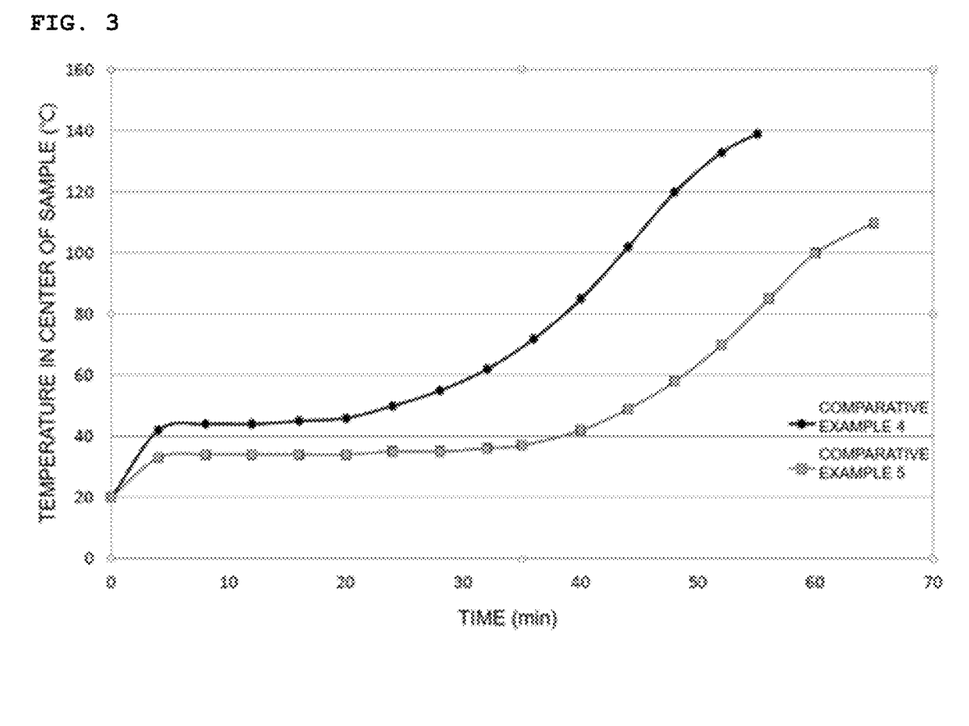
FIG. 3 is a graph illustrating temperatures of a drying sample over drying time in Comparative Examples 4 and 5.

FIG. 2 illustrates the temperature profile of the wet-gel blanket sample over the drying time derived from Examples 1, 2, and 4, and FIG. 3 illustrates the temperature profile of the wet-gel blanket sample over the drying time in Comparative Examples 4 and 5.

In addition, with respect to Comparative Example 1 in which the hot air drying was performed and Comparative Example 2 in which the supercritical drying was performed, the drying time was measured from the drying start point to the drying end point, and the results are shown in Table 1 below.

2) Measurement of Thermal Conductivity (mW/mK, 25° C.)

Thermal conductivity at room temperature (25° C.) of the aerogel blanket prepared in each of Examples and Comparative Examples by using HFM 436 equipment from NETZSCH.

3) Measurement of Impregnation Ratio of Moisture (wt %)

Impregnation ratio of moisture of the aerogel blanket prepared in each of Examples and Comparative Examples was measured according to ASTM C1511 standard.

The lower the impregnation ratio of moisture, the higher the hydrophobicity of the aerogel blanket.

4) Measurement of BET Specific Surface Area, Pore Volume, and Average Pore Diameter With respect to the aerogel blanket prepared in Example 1, Example 2, and Comparative Example 1 above, adsorption/desorption amount of nitrogen depending on partial pressure (0.11<p/p o<1) were measured by using 3 FLEX device from Micrometrics, and from these, a BET specific surface area, a pore volume, and an average pore diameter of the aerogel blanket were evaluated, and the results are shown in Table 2 below.

TABLE 1

| | | Infrared ray emitting body | | Distance between sample and emitting body (mm) | First isothermal section time (min) | Temperature rising section time (min) | Second isothermal section time (min) | Total drying time (min) | Thermal conductivity (mW/mK) | Impregnation ratio of moisture (wt %) |
|---|---|---|---|---|---|---|---|---|---|---|
| | | Type | Surface temperature (° C.) | Output of irradiation device (%) | | | | | | | |
| Examples | 1 | Carbon heater for MIR | 900 to 1000 | 70 | 100 | 10 | 10 | 0 | 20 | 20.4 | 0.8 |
| | 2 | Carbon heater for MIR | 900 to 1000 | 70 | 100 | 10 | 10 | 10 | 30 | 21.5 | 2.2 |
| | 3 | Carbon heater for MIR | 1000 to 1100 | 80 | 150 | 15 | 10 | 5 | 30 | 21.0 | 0.6 |
| | 4 | Ceramic heater for FIR | 600 to 650 | 90 | 100 | 20 | 15 | 5 | 40 | 20.5 | 0.7 |
| | 5 | Ceramic heater for FIR | 600 to 650 | 90 | 150 | 30 | 20 | 20 | 70 | 21.2 | 2.5 |
| | 6 | Ceramic heater for FIR | 650 to 700 | 95 | 150 | 25 | 20 | 0 | 45 | 20.8 | 0.6 |
| Comparative examples | 1 | — | — | — | — | — | — | — | 40 | 27.7 | 1.5 |
| | 2 | — | — | — | — | — | — | — | 420 | 19.5 | 1.1 |
| | 3 | Carbon heater for MIR | 900 to 1000 | 70 | 100 | 10 | 10 | 25 | 45 | 24.5 | >100 |

TABLE 1-continued

| | Infrared ray emitting body | | Distance between sample and emitting body (mm) | First isothermal section time (min) | Temperature rising section time (min) | Second isothermal section time (min) | Total drying time (min) | Thermal conductivity (mW/mK) | Impregnation ratio of moisture (wt %) |
|---|---|---|---|---|---|---|---|---|---|
| | Type | Surface temperature (° C.) | Output of irradiation device (%) | | | | | | |
| 4 | Carbon heater for MIR | 700 to 800 | 50 | 200 | 20 | 35 | 0 | 55 | 27.8 | 0.9 |
| 5 | Ceramic heater for FIR | 100 to 170 | 40 | 100 | 35 | 30 | 0 | 65 | 28.1 | 0.7 |
| 6 | Carbon heater for MIR | 900 to 1000 | 70 | 40 | 4 | 5 | 0 | 9 | 26.2 | >100 |
| 7 | Carbon heater for MIR | 1150 to 1200 | 90 | 100 | 5 | 4 | 0 | 9 | 27.1 | >100 |

Referring to the temperature profile of the wet-gel blanket sample over the drying time derived from Examples 1, 2 and 4 of FIG. 2, in Examples 1 and 2, a first isothermal section, in which the temperature of the wet-gel blanket is gently elevated with a constant inclination value for 10 minutes from the drying start point, appears, and a temperature rising section, in which the temperature rises relatively sharply, appears in a section of 10 minutes to 20 minutes. In Example 1, the infrared ray drying is completed through the first isothermal section and the temperature rising section, and in Example 2, a second isothermal section, in which the temperature is gently elevated again after the temperature rising section, appears in a section of 20 minutes to 30 minutes. In Example 4, a first isothermal section appears for 20 minutes from the drying start point, a temperature rising section appears in a section of 20 minutes to 35 minutes, and a second isothermal section appears in a section of 35 minutes to 40 minutes. As described above, the first isothermal section, the temperature rising section, and the second isothermal section can be confirmed through the temperature change in the center of the drying sample over the drying time in Examples 1, 2 and 4 shown in FIG. 1.

In addition, FIG. 3 illustrates the temperature of the center of the drying sample over the drying time in Comparative Examples 4 and 5, and referring to FIG. 3, in Comparative Example 4, a first isothermal section, in which the temperature of the wet-gel blanket is gently elevated with a constant inclination value for 20 minutes from the drying start point, appears, and then a 35-minute temperature rising section appears. In addition, in Comparative Example 5, a first isothermal section, in which the temperature of the wet-gel blanket is gently elevated with a constant inclination value for 35 minutes from the drying start point, appears and then a 30-minute temperature rising section appears.

Meanwhile, referring to Table 1 above, it can be seen that Examples 1 to 6, in which the infrared ray drying is performed so that each time of the first isothermal section, the temperature rising section, and the second isothermal section is included in a range specified by the present invention, have lower values of the thermal conductivity and the impregnation ratio of moisture compared to Comparative Examples 1 to 7 in which the drying is performed but the infrared ray drying is not applied or even if the infrared ray drying is applied, the time for each section is out of the above time range.

Specifically, it can be seen that Examples 1 to 6 show significantly lower values of the thermal conductivity and the impregnation ratio of moisture compared to Comparative Example 1 in which the hot air drying is applied without applying the infrared ray drying, and show the thermal conductivity equivalent to Comparative Example 2 in which the supercritical drying is applied, but have the lower impregnation ratio of moisture, and in particular, the drying time is greatly reduced.

In addition, it can be confirmed that Examples 1 to have the shorter total drying time, lower thermal conductivity, and in particular, significantly lower impregnation ratio of moisture compared to Comparative Example 3 in which the second isothermal section is out of the range of the present invention, and thus have excellent hydrophobicity. In addition, it can be seen that Examples 1 to 6 have a lower value of the thermal conductivity compared to Comparative Examples 4 and 5 in which the time of the first isothermal section or the temperature rising section exceeds the range of the present invention. In addition, it can be seen that Examples 1 to 6 have lower thermal conductivity, and in particular, significantly lower impregnation ratio of moisture compared to Comparative Examples 6 and 7 in which the time of the first isothermal section or the temperature rising section is less than the range of the present invention, and thus have excellent hydrophobicity.

TABLE 2

| | BET specific surface area (m²/g) | Pore volume (cm³/g) | Average pore diameter (nm) |
|---|---|---|---|
| Example 1 | 667 | 2.08 | 9.0 |
| Example 2 | 495 | 1.63 | 8.9 |
| Comparative Example 1 | 413 | 1.14 | 7.4 |

As in Table 2 above, it can be seen that Examples 1 and 2, in which the infrared ray drying is performed so that each time of the first isothermal section, the temperature rising section, and the second isothermal section is included in a range specified by the present invention, show all of excellent BET specific surface area, pore volume, and average pore diameter compared to Comparative Example 1 in which the hot air drying is performed.

The invention claimed is:
1. A method for drying a wet-gel blanket, the method comprising:

drying the wet-gel blanket by irradiating the wet-gel blanket with infrared rays (IR), wherein in the drying, infrared rays are irradiated so that a first isothermal section of 5 minutes to 30 minutes, a temperature rising section of 5 minutes to 30 minutes, and a second isothermal section of 20 minutes or less are included in a temperature profile over time of drying the wet-gel blanket.

2. The method of claim 1, wherein a surface temperature of an infrared ray emitting body is 200° C. to 1,100° C.

3. The method of claim 1, wherein a distance between an infrared ray emitting body and the wet-gel blanket during drying is 50 mm to 170 mm.

4. The method of claim 1, wherein the infrared rays comprise infrared rays in a wavelength range of 2 μm to 15 μm.

5. The method of claim 1, wherein the drying is performed for a total of 10 minutes to 80 minutes.

6. The method of claim 1, wherein the wet-gel blanket is a fiber-silica gel composite which is prepared by depositing and gelating a silica sol on a blanket base.

7. A method for producing an aerogel blanket, the method comprising:
1) Mixing a precursor material, an organic solvent, water, and an acid catalyst to prepare a sol;
2) Depositing and gelating the sol on a blanket base to form a wet-gel blanket by the gelating reaction;
3) Surface-modifying the wet-gel blanket with a surface modification agent to form a surface-modified wet gel blanket; and
4) Drying the surface-modified wet-gel blanket,
wherein the drying is performed by the method of claim 1.

8. The method of claim 7, wherein the precursor material comprises a silicate compound, and the aerogel blanket is a silica aerogel blanket.

9. The method of claim 7, further comprising aging the wet-gel blanket formed by the gelating reaction between the gelating and the surface-modifying.

10. The method of claim 7, wherein the surface modification agent is a compound which hydrophobicizes the surface of the wet-gel blanket.

* * * * *